Figure 1:
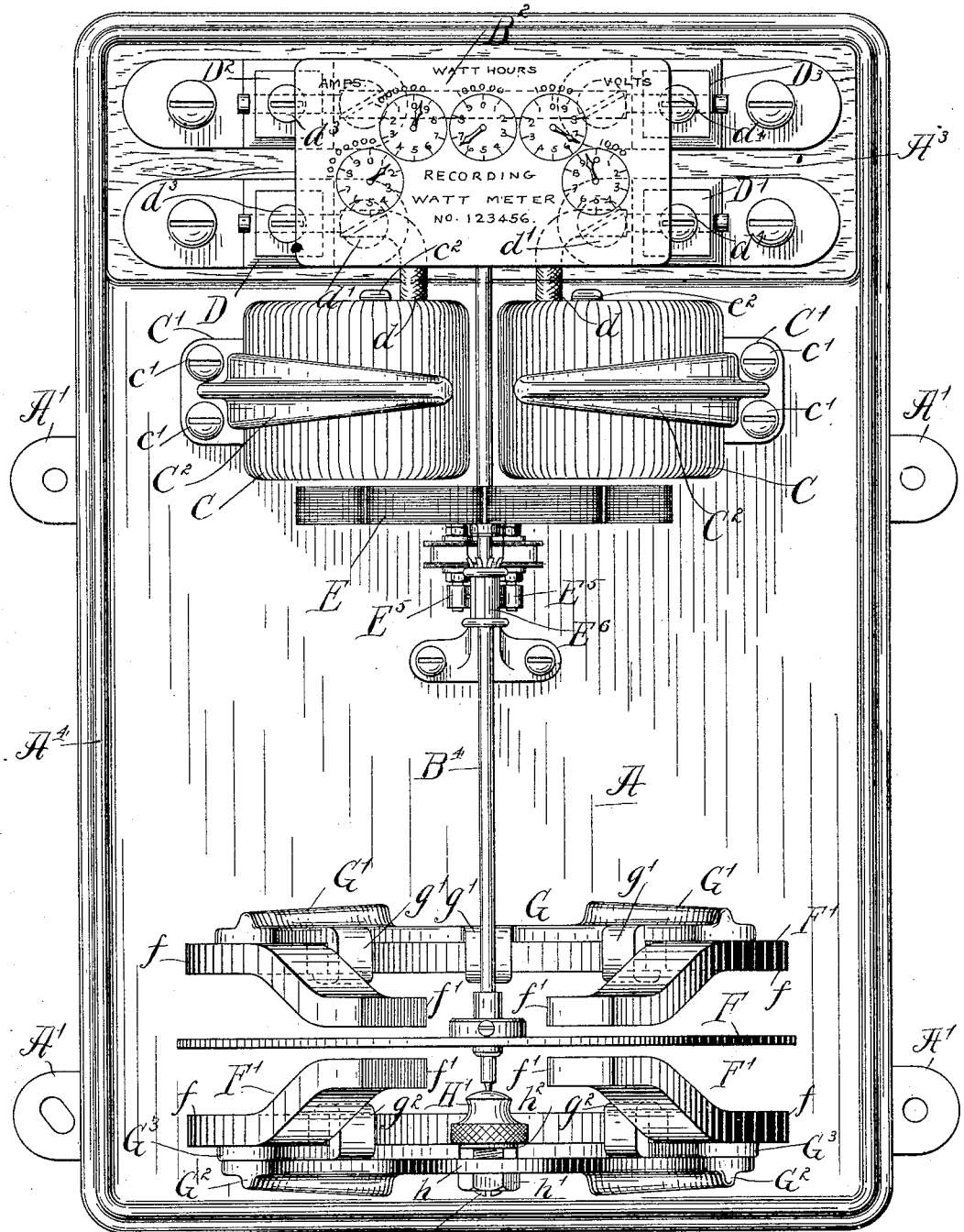

(No Model.) 6 Sheets—Sheet 1.

T. DUNCAN.
ELECTRIC METER.

No. 573,080. Patented Dec. 15, 1896.

Witnesses
F. L. Sessions
L. Clinton Hamlink

Inventor
Thomas Duncan
By his Attorneys
Parkinson Carter and Graves (No Model.) 6 Sheets—Sheet 4.
T. DUNCAN.
ELECTRIC METER.

No. 573,080. Patented Dec. 15, 1896.

Witnesses
F. L. Sessions,
L. Clinton Hamlick

Inventor
Thomas Duncan
By his Attorneys
Parkinson Carter & Graves (No Model.) 6 Sheets—Sheet 5.

T. DUNCAN.
ELECTRIC METER.

No. 573,080. Patented Dec. 15, 1896.

Witnesses
F. L. Sessions,
L. Clinton Hamlink

Inventor
Thomas Duncan
By his Attorneys
Parkinson Carter & Graves (No Model.)
6 Sheets—Sheet 6.

T. DUNCAN.
ELECTRIC METER.

No. 573,080.                           Patented Dec. 15, 1896.

Witnesses
F. L. Sessions.
L. Clinton Hamlick.

Inventor
Thomas Duncan
By his Attorneys
Parkinson Carter and Graves

UNITED STATES PATENT OFFICE.

THOMAS DUNCAN, OF FORT WAYNE, INDIANA.

ELECTRIC METER.

SPECIFICATION forming part of Letters Patent No. 573,080, dated December 15, 1896.

Application filed July 22, 1896. Serial No. 600,087. (No model.)

*To all whom it may concern:*

Be it known that I, THOMAS DUNCAN, a citizen of the United States, residing at Fort Wayne, in the county of Allen and State of Indiana, have invented certain new and useful Improvements in Electric Meters, of which the following is a specification.

My invention relates particularly to that class of meters having a wound armature and known as "commutated integrating wattmeters," for either direct or alternating currents; but certain of its features are applicable to other constructions, as will be evident from the ensuing description.

There is a demand among central-station men, and, in fact, from every one identified with the care and management of electric meters, for an instrument that shall be accurate, simple, easily adjusted, applicable alike to either direct or alternating current distribution, and, above all, that can be easily repaired and cleaned without having to be entirely taken apart, as is the case with the present meters on the market, some of which, in fact, are so complicated that when anything goes wrong the owners invariably return them to the makers for readjustment or repairs, thereby incurring decided expense that often assumes very considerable proportions during the year.

To supply these wants is the object of this invention; and it consists, among other things, in a novel form of field-coils; in combining with said field-coils an armature of peculiar winding; in providing for the ready and bodily removal of the spindle and parts carried thereby, including the armature and rotary element of the drag or brake, without disturbing the field-magnets or other agencies of the meter; in combining with a brake-disk permanent magnets of circular form, each lying wholly on one side of said disk and having its poles or ends bent or turned toward the surface of the disk, and in a commutator composed of an alloy of silver and nickel, all as hereinafter described and claimed.

Figure 2:
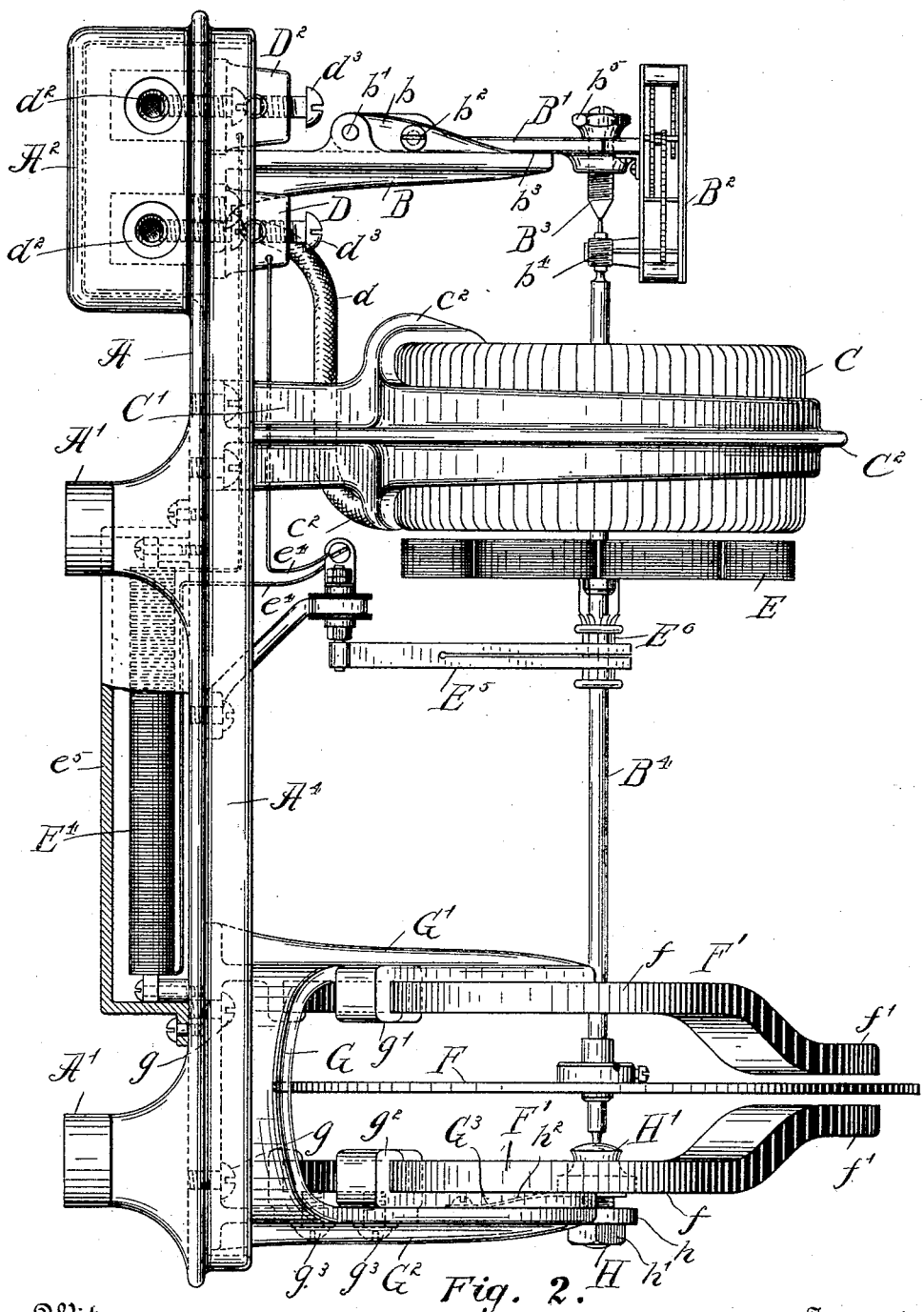
Figure 3:
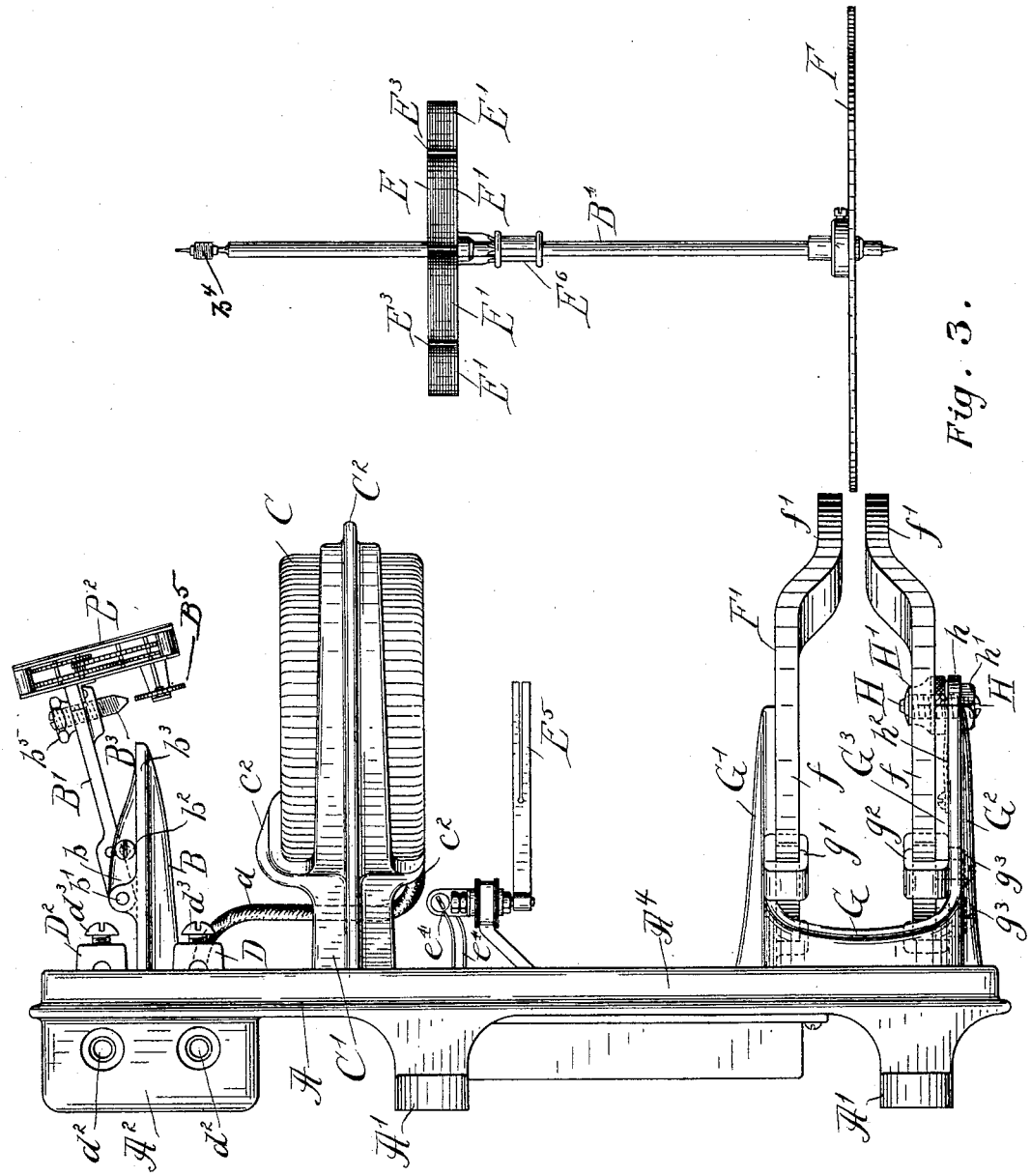
Figure 4:
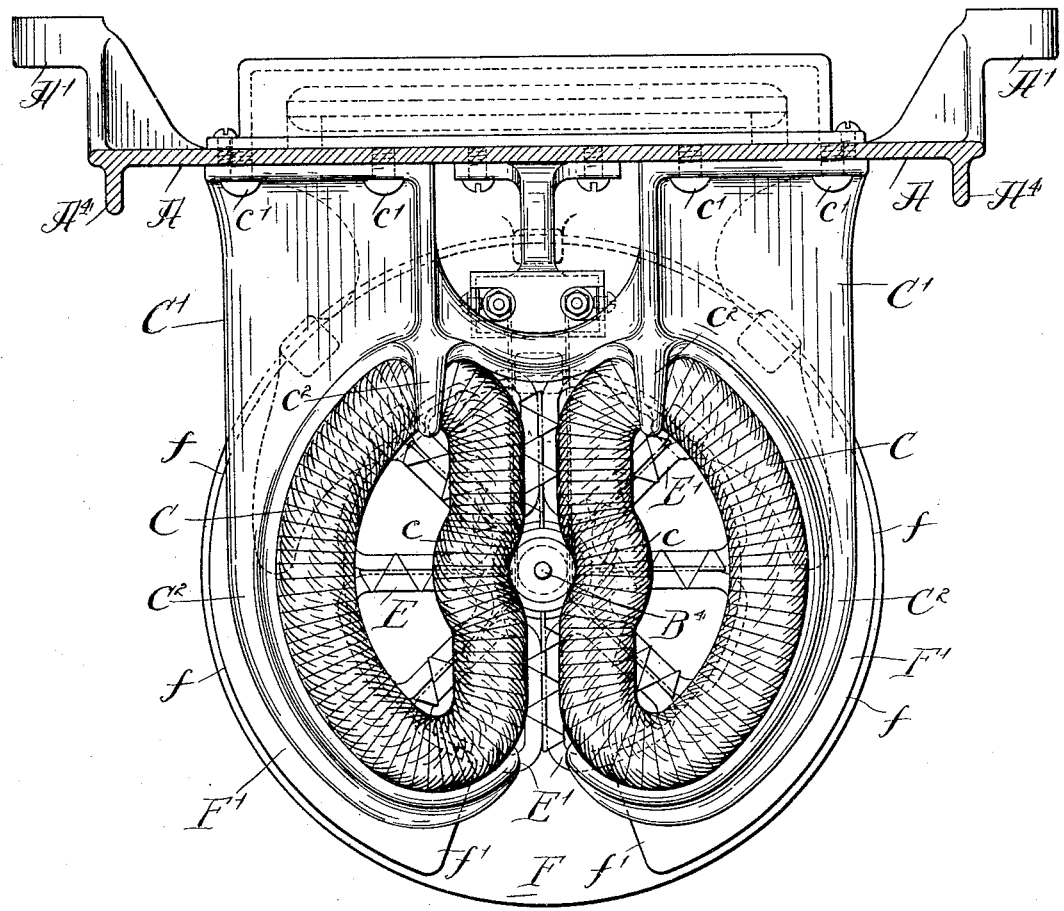
Figures 5, 6:
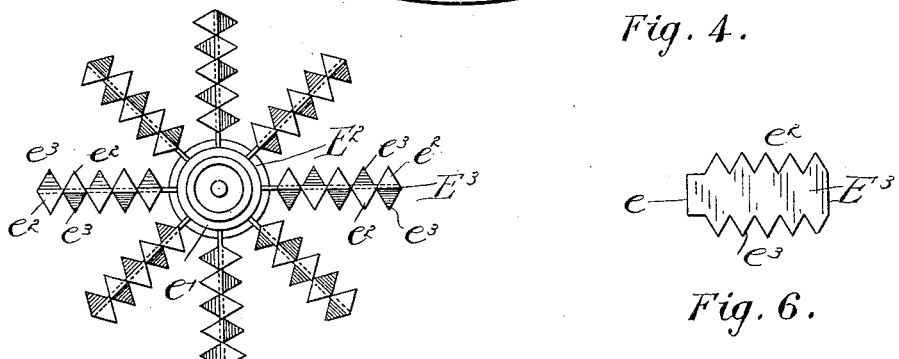
Figure 7:
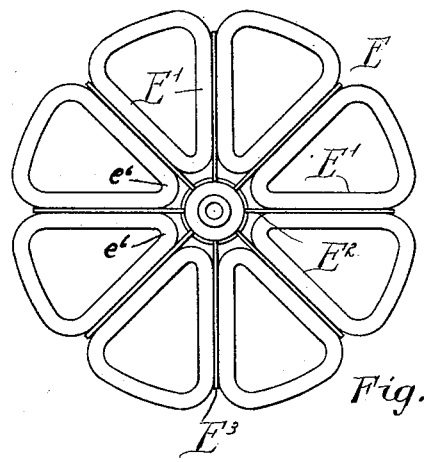
Figure 8:
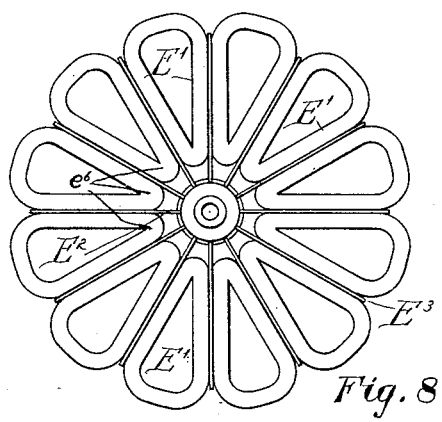
Figure 9:
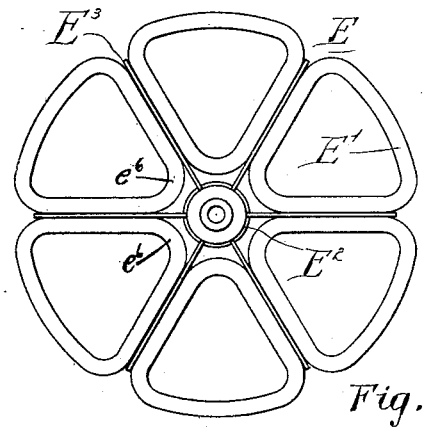
Figure 10:
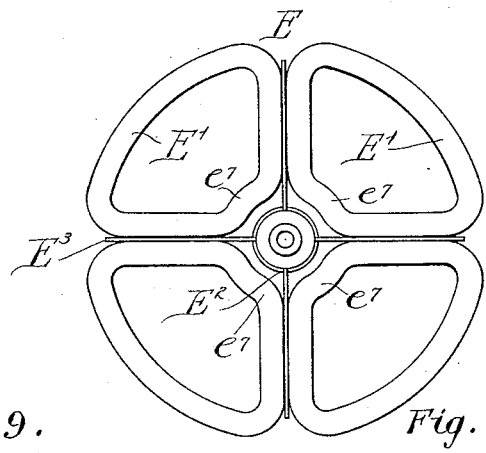
Figure 11:
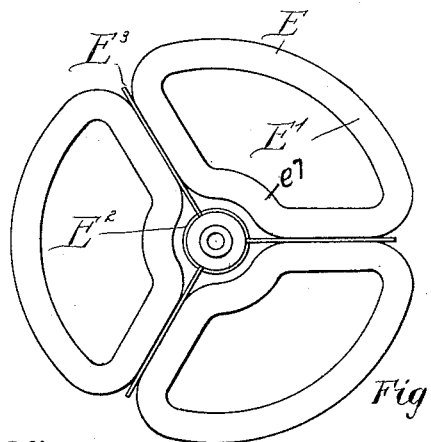
Figure 12:
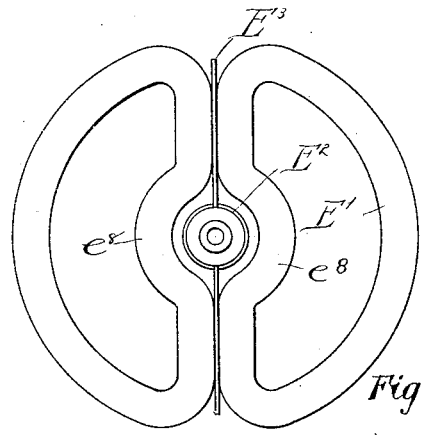
Figure 13:
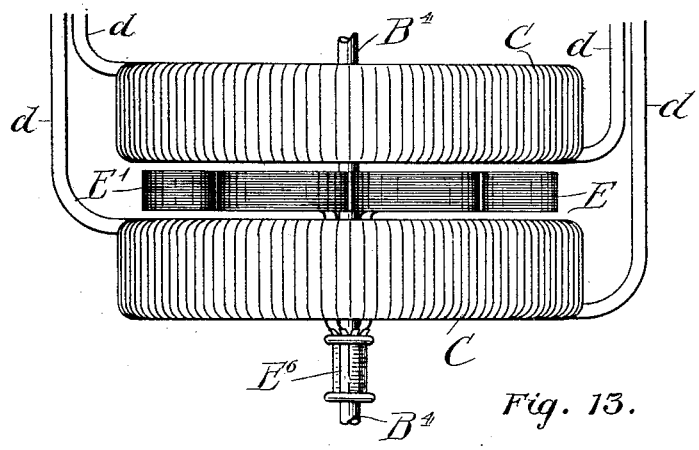
Figure 14:
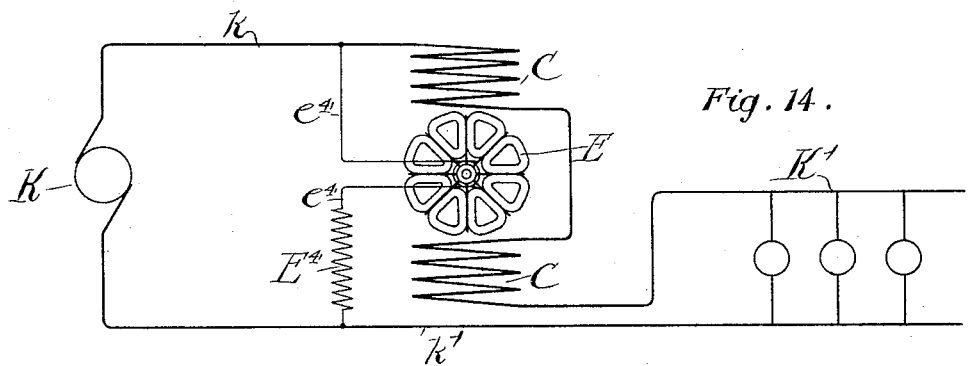
Figure 15:
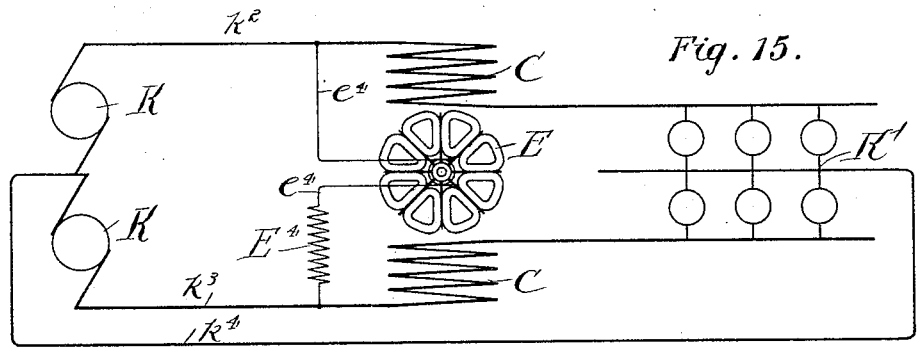

In the drawings, Figure 1 is a front elevation of a meter embodying my invention in its preferred form. Fig. 2 is a side elevation thereof, the parts being in position for operation. Fig. 3 is also a side elevation illustrating the manner of detaching and removing the spindle, armature, and revolving drag from the stationary parts of the meter. Fig. 4 is a plan view of the motive parts, including also the retarding-disk and permanent magnets. Fig. 5 represents a form of armature-spider to hold the armature-coils in position, while Fig. 6 is a detail of one of the arms of said spider as punched and before being soldered into the hub. Figs. 7 to 12 show different forms of coils or methods of winding which may be employed in the construction of my improved armature. Fig. 13 is a modification or alternate construction of the motive parts in which the armature rotates between upper and lower sets of field-coils; and Figs. 14 and 15 are diagrammatic views of the arrangement of the meter, respectively, in two and in three wire systems of constant-potential distribution.

The back plate A is provided with feet A' for attachment to a suitable support, with pocket $A^2$ for the reception of an insulating-block $A^3$, of wood or other material, and with rib $A^4$ to center and stay the inclosing block or casing, and in these respects does not differ from others heretofore made by me. Secured to its face or projecting therefrom, near the top thereof, is a bracket B, having ears $b$, between which is hinged, by horizontal pivot $b'$, the inner end of a bracket-arm B', which carries the registering-train $B^2$ at its outer end, and is normally held rigidly in position by screw $b^2$ or other convenient fastening, with its body lying upon and alined by the flat extension $b^3$ of said bracket. Adjacent to the registering-train the bracket-arm receives the screw-bearing $B^3$ for the upper end of the meter-spindle $B^4$, suitably stepped at its foot and driving the train through worm $b^4$ and intermeshing worm-wheel $B^5$, as usual in this class of machines. A jam-nut $b^5$ serves to fix the bearing in position when once set and maintain its adjustment relatively to the spindle, and by taking out the screw $b^2$ the bracket-arm may be thrown up, carrying with it the registering-train and worm-wheel, as in Fig. 3, without disturbing such adjustment, to release the spindle for removal, or may be returned when the spindle is restored to position and instantly hold it under exactly the same adjustment as before.

C are the field or series coils, having the general outline of a segment of a circle, the arc of which approximates one hundred and eighty degrees and the chord of which is herein shown as centrally somewhat inset or provided with a jog or incurved reach $c$ to give clearance for the meter-spindle, it being understood that such jog may be omitted, if desired, and the necessary clearance provided by spacing the coils a little farther apart. These are held at the proper height and in a plane at right angles to the spindle by a casting or castings $C'$, secured to the back plate by screws $c'$ and having outstretching curved arms $C^2$, which grip the exposed periphery or curvilinear limbs of the coils, and clamping-fingers $c^2$, which embrace them at the junction of the arc and the chord, as clearly shown in Fig. 4 of the drawings, the arrangement being such that the chordal limbs run parallel with each other, one on each side of the spindle, and sufficiently apart to admit the lateral removal or introduction of said spindle between them. Should more than two series coils be desired in the same plane, they may be wound in segment form, as will be readily understood from the ensuing description of the armature and its windings, but the construction described I now consider preferable.

The series coils are traversed by the current supplying the lamps, motors, or other translating devices, and are put in circuit by connecting their terminals $d$ to the lower binding-posts D and D' by screws $d'$, the two leads from the generator entering through apertures $d^2$ in the casing and being connected to the two left-hand posts D and $D^2$ by the screws $d^3$, and the wires of the work-circuit being clamped in the right-hand posts D' and $D^3$ by screws $d^4$ and leaving through apertures on that side. This arrangement gives the difference of potential of the circuit between the upper and lower binding-posts, so that the necessary shunt connection for the armature can be made within the meter.

A disk armature E is located upon the spindle directly underneath the series coils, and consists of a number of sector-shaped coils E' of fine wire held by the spokes or radiating arms of the spider or support $E^2$, secured to the spindle. These arms may conveniently be made of punchings $E^3$, having shanks $e$, by which they are soldered to their hub $e'$ and teeth $e^2$ $e^3$, which are turned alternately above and beneath in either direction to bind upon the coils and hold them in position. Current is supplied to the armature from the upper and lower left-hand binding-posts through the terminals $e^4$, non-inductive resistance $E^4$, covered and protected by a metal shield $e^5$ on the back of the meter, brushes $E^5$, and commutator $E^6$, thus bringing it in shunt to the work-circuit. The armature may have any number of coils. For instance, in Fig. 7 it is shown with eight, in Fig. 8 with twelve, and in Fig. 9 with six, the apexes $e^6$ of the sectors being more or less acute and well defined, while in Fig. 10 there are four and in Fig. 11 three coils with injogged or truncate apexes $e^7$ to clear the hub of the armature frame or spider, and in Fig. 12 there are but two coils having a segment outline with a jogged or insetting reach $e^8$ in the chord, as in the series coils hereinbefore described. This peculiar winding results in the utilization of a maximum number of lines of force from the series coils, or, in other words, a maximum effective area of force, and brings the armature-coils constantly within the influence of practically the entire field of the series coils, since, as shown in Fig. 4, the arcal limbs of the series coils coincide with the arcal limbs of the armature-coils, the jogs or curved reaches of the chordal sides of the series coils (or apexes, if they are sector-wound) with the apexes of the armature-coils, and the chordal or radial limbs of said series coils with the radial limbs of said armature-coils.

When a current traverses the series coils, a magnetic field is established that varies in the same ratio as the current. Hence it can be said that the field strength is at all times proportional to the current passing through them. The disk armature, (shown in Fig. 1 as placed underneath the series coils, but which may be placed above them or duplicated, one above and one beneath, or arranged between upper and lower groups of series coils, as in Fig. 13,) being in shunt or parallel, will be supplied with a current depending upon its resistance and the pressure to which it is subjected. However, since its resistance is constant, the current flowing through it will vary with the electromotive force or pressure of the generator. This produces a field in the armature the intensity of which will be proportional to the electromotive force at any instant. We have then a torque produced by these two fields, one representing the current strength, the other the electromotive force, and which is equal to the product of their strengths.

The watts or energy being equal to the product of the current C and the electromotive force E, or $E \times C$, it is obvious that the torque of the series field and the armature-field is also equal to the watts. The instrument will therefore register the true energy at all times, even though the current in the series coils and that in the armature be changing in strength, i. e., the torque present will always be equal to the watts.

Upon the meter-spindle is secured a metallic disk F, of aluminium, for example, which rotates between the poles of the permanent magnets F' and thereby generates a load or brake force upon which the motor does work in order that its speed may be proportional to the watts, as is well understood in the art. In the present instance the magnets are constructed and arranged in such manner that the disk and spindle may be readily removed or withdrawn without disturbing their normal position. Each magnet is complete by itself on its own side of the disk and is circular in outline, as at $f$, with its poles $f'$, turned or dipped in or down toward the disk from the plane of the body portion, which is or may be parallel with the disk. This form is easily made, easily placed in position, removed with ease when necessary, easily magnetized, much stronger for a given weight of steel than any other form, and with less leakage between its limbs, since it is the ideal form, "circular."

In the magnetic brake most commonly in use horseshoe-magnets are so arranged that their limbs embrace opposite sides of the brake-disk and their yokes are necessarily outside of the periphery thereof. In this construction when the disk is set in rotation the eddy-currents tend to push and do push the lines of force of the magnet from the pole-pieces back toward the neutral part or yoke, so that when the disk is in motion many of these lines entirely escape it, passing through the air-gap between the yoke and the edge of the disk. This condition is such that it does not allow a constant number of lines of magnetic force to cut the disk at any and all speeds, the result being that the quicker the disk rotates the weaker, apparently, will the magnets become, resulting finally in overspeed of the motor on any load. Again, when these lines of force are pushed back many times it in the end weakens the strength of the magnet as a whole, because it changes the molecular setting from its original state. Pushing back the lines also causes them to cut another and new part of the disk having a different surface speed from that which should be, or, as it were, for every speed the majority of lines will have no definite place to cut through. In the employment of magnets according to the present invention these conditions cannot occur. The leakage toward the yoke when the disk rotates between the magnets is imperceptible, since the air-space is so large that the lines of force must cut through the disk in order to leak at any point. Very few lines will pass between N and S of the individual magnets, because the air-gap is so much greater than between these poles and the adjacent poles of the opposing magnet on the other side of the disk. Therefore the great mass of the lines will be forced to cut the disk directly at the poles.

The magnets are held firmly in place by the casting G, of brass, secured to the back plate by screws $g$ and having upper and lower projecting arms $G'$ $G^2$, supplied with clamping-fingers $g'$ $g^2$, whereby the magnets are embraced. To vary the strength of the drag, the lower magnet, which of course is placed with its poles reversed in sign to the opposite poles of the upper, may be moved backward and forward in the horizontal in any suitable manner, as herein shown, and its clamping-fingers $g^2$ are to this end formed independently of the table-form bracket-arm $G^2$ upon a plate $G^3$, which is adjustably held to said arm by screws $g^3$ in a well-known way.

At the present time silver is usually employed for commutators, but it gives a constant cause for trouble, since it turns black and roughens quickly. This causes sparking and results in the meter moving slowly and sometimes stopping altogether. I have found that an alloy of silver and nickel in the proportion of about five to twenty per cent. of nickel eliminates this trouble, keeps its polish indefinitely, gives the best results, and admits of the resistance being low. The silver tends to keep up the conductivity, while the nickel hardens the alloy and prevents its turning black and rough. A commutator of nickel alone gives fairly good results, but one of alloy, as above, is to be given the preference.

The meter-spindle rests upon a jewel placed in the top of the adjustable post H, which post is held firmly in a tongue $h$ from the lower bracket-arm $G^2$ by the nut $h'$. A cap $H'$ raises the spindle off the jewel when being shipped, and a flat spring $h^2$ holds this cap upon the jewel-post H in any desired position, the construction not differing materially from that illustrated and described in Letters Patent No. 551,436, granted me on the 17th day of May, 1895, except in the substitution of the flat spring for the spiral spring therein shown and the resulting economy of space and greater ease of manipulation.

If the armature, and, in fact, the entire moving system, is to be removed, it is only necessary to turn down the cap $H'$ until the top of the jewel-post is exposed, then release or remove the screw $b^2$ or other fastening which locks the hinged bracket-arm carrying the registering-train, and turn up said arm, when the armature, spindle, commutator, and brake-disk are free to be bodily withdrawn, as shown in Fig. 3, without disturbing other parts or any adjustments. This can be performed without moving the meter from its place, the armature being taken away for repairs, which by this construction are very simply and quickly made.

In Fig. 14 the meter is represented diagrammatically as working on a two-wire system and in Fig. 15 as working on a three-wire system. In the former the series coils are connected in series in the side or lead $k$ of the circuit from the generator K, thence to the lamps $K'$, the other side or lead $k'$ running to the lamps direct, as shown. In the latter each of the series coils is connected into the two outside leads $k^2$ and $k^3$, respectively, thence to the lamps, the line $k^4$ being the neutral lead.

The foregoing description has had reference to a constant-potential system of distribution. By winding the series coils with fine wire and connecting them in shunt around a number of arc-lamps and supplying the armature with a current representative of the main current the meter will measure the watts on a constant-current system with a variable electromotive force.

I claim—

1. A disk armature comprising a plurality of sector or segment wound coils lying flatwise in the disk with their arcs toward the periphery thereof, in combination with sector or segment wound series coils laid parallel with the plane of the disk with their arcs overlying the arcs of the armature-coils.

2. In combination with the disk armature and armature-spindle, the segment-wound series coils having an insetting jog in the chordal limbs.

3. In combination with the series coils having an arcal outer reach and an insetting jog in the inner reach, the armature-coils also wound with an arcal outer reach and an insetting jog in the inner reach.

4. In combination with the segment-wound series coils, the supporting-clamps therefor having outsetting curved arms to embrace the arcal reaches of said coils, and transverse fingers to embrace them at the junction of the arc and the chord.

5. In combination with the meter-spindle, an adjustable upper bearing therefor and means for removing said bearing from the spindle and returning it thereto without disturbing its adjustments.

6. In combination with the meter-spindle, a support for the upper bearing thereof, an upper bearing for the spindle adjustably mounted in said support, and means for the removal of said support from its location adjacent to the end of the spindle, and its return thereto, carrying with it said bearing without disturbing its adjustment.

7. In combination with the meter-spindle, an overhanging bracket-arm movable away therefrom and an upper bearing for the spindle mounted in said arm.

8. In combination with the meter-spindle, an overhanging bracket-arm movable away therefrom, an upper bearing for said spindle mounted in said arm, and means for adjusting said bearing in the arm.

9. In combination with the meter-spindle and its attachments, the removable upper bearing for said spindle, and the series coils having an opening between them through which the spindle may be drawn sidewise bodily with its attachments.

10. In combination with the meter-spindle and its attachments, the upper bearing therefor mounted and adjustable in a bracket-arm movable away from said spindle, and the series coils having an opening between them through which the spindle may be drawn sidewise.

11. In combination with the meter-spindle, and the armature and brake-disk, the removable upper bearing for said spindle, the series coils having an opening betweeen them for the sidewise withdrawal of the spindle and its attachments, and the fixed brake-magnets opening at the same side, for the withdrawal of the brake-disk with said spindle.

12. In combination with the meter-spindle, the hinged overhanging bracket-arm, the upper bearing for said spindle mounted in said bracket-arm, and a fastening device for said arm whereby it may be rigidly fixed to hold the bearing against the spindle.

13. In combination with the meter-spindle and its worm, the hinged overhanging bracket-arm, the registering-train and its worm-wheel mounted at the outer end of said arm, the upper bearing for said spindle also carried by said arm adjacent to the registering-train, and a fastening device to lock said arm rigidly into position.

14. In combination with the meter-spindle, removable overhanging bracket-arm and upper bearing mounted in said arm, the lower bearing set in the jewel-post, and the screw-cap for said lower bearing.

15. In combination with the meter-spindle, the hinged overhanging bracket-arm, the upper bearing mounted in said bracket-arm, and the bracket to which said arm is hinged, having a prolongation beyond the pivotal point for the alinement and support of the arm.

16. In combination with the brake-disk, the brake-magnets having turned-down poles and arranged one on each side of the disk with both poles of each individual magnet on the same side of the disk.

17. In combination with the brake-disk, brake-magnets having turned-down poles both upon the same side of the disk, and arranged with their bodies parallel with the plane of the disk and upon opposite sides thereof.

18. In combination with the brake-disk, the brake-magnets, the bracket therefor having outsetting overhung arms provided with clamping-fingers for the upper magnet, and a subtending table upon which the jewel-post for the lower end of the spindle is supported, and a plate adjustable along said table and carrying the lower magnet.

19. In combination with the brake-disk, circular permanent magnets arranged individually on opposite sides of the disk, having their body portions parallel with the plane of the disk and their poles dipped or bent down toward the surface of the disk.

20. In combination with the armature-coils the armature-spider having outsetting radial arms with upper and lower teeth turned alternately in either direction to clamp the coils.

21. A commutator composed of an alloy of silver and nickel, substantially as described.

THOMAS DUNCAN.

Witnesses:
ROBERT F. HARDING,
CHARLES C. MILLER.